United States Patent [19]
Denton et al.

[11] Patent Number: 5,865,968
[45] Date of Patent: Feb. 2, 1999

[54] GAS DIFFUSION ELECTRODES

[75] Inventors: Jan Denton, Reading; John M. Gascoyne, High Wycombe; Robert J. Potter, Chalkhouse Green, all of United Kingdom

[73] Assignee: Johnson Matthey Public Limited Company, London, United Kingdom

[21] Appl. No.: 802,556

[22] Filed: Feb. 19, 1997

[30] Foreign Application Priority Data

Feb. 28, 1996 [GB] United Kingdom ............... 9604191
Dec. 23, 1996 [GB] United Kingdom ............... 9626802

[51] Int. Cl.$^6$ .................................................... C25B 11/00
[52] U.S. Cl. ............................. 204/284; 429/40; 429/41; 429/42
[58] Field of Search .................................. 204/283, 284; 429/40, 41, 42

[56] References Cited

U.S. PATENT DOCUMENTS

| | | | |
|---|---|---|---|
| 3,544,381 | 12/1970 | Miller | 136/86 |
| 3,706,602 | 12/1972 | Miller | 136/120 |
| 3,972,735 | 8/1976 | Breault | 136/122 |
| 4,115,627 | 9/1978 | Christner et al. | 429/44 |
| 4,680,100 | 7/1987 | Morin | 204/228 |
| 4,729,932 | 3/1988 | McElroy | 429/34 |
| 4,780,437 | 10/1988 | Smith | 502/101 |
| 4,894,355 | 1/1990 | Takeuchi et al. | 502/101 |
| 5,242,765 | 9/1993 | Naimer et al. | 428/42 |
| 5,292,600 | 3/1994 | Kaufman | 429/39 |
| 5,308,465 | 5/1994 | Hillrichs et al. | 204/283 |
| 5,322,744 | 6/1994 | Koseki | 429/13 |

FOREIGN PATENT DOCUMENTS

| | | |
|---|---|---|
| 0184638 | 6/1986 | European Pat. Off. . |
| 0226280 | 6/1987 | European Pat. Off. . |
| 0226911 | 7/1987 | European Pat. Off. . |
| 0228602 | 7/1987 | European Pat. Off. . |
| 0499593 | 8/1992 | European Pat. Off. . |
| 582333 | 2/1994 | European Pat. Off. . |
| 654837 | 5/1995 | European Pat. Off. . |
| 62-156285 | 7/1987 | Japan . |
| 62-184768 | 8/1987 | Japan . |
| 62-232860 | 10/1987 | Japan . |
| 62-232861 | 10/1987 | Japan . |
| 06267555 | 9/1994 | Japan . |
| 0981918 | 1/1965 | United Kingdom . |
| 1158580 | 7/1969 | United Kingdom . |
| 1467147 | 3/1977 | United Kingdom . |

OTHER PUBLICATIONS

"Management of the Water Content in Polymer Electrolyte Membranes with Porous Fiber Wicks" J. Electrochem, Soc., vol. 140, No. 11, pp. 3190–3193, Nov. 1993.

*Primary Examiner*—Bruce F. Bell
*Attorney, Agent, or Firm*—Stevens, Davis, Miller & Mosher, L.L.P.

[57] ABSTRACT

A gas diffusion electrode comprising a non-woven network of fibres, one or more catalysts components and at least one polymeric substance characterized in that the catalyst is embedded within the fibre network is disclosed.

20 Claims, 2 Drawing Sheets

GAS DIFFUSION ELECTRODES

FIELD OF THE INVENTION

The present invention relates to a novel gas diffusion electrode structure which is of use in electrochemical devices, particularly fuel cells, and a process for the manufacture of the novel gas diffusion electrode structure.

BACKGROUND DISCUSSION

Electrochemical cells invariably comprise at their fundamental level a solid or liquid electrolyte and two electrodes, the anode and cathode, at which the desired electrochemical reactions take place. Gas diffusion electrodes are employed in a range of electrochemical devices, in which a gaseous reactant and/or product has to be diffused into and/or out of one of the cell electrode structures. They are designed to optimise the contact between the reactant and the electrolyte to maximise the reaction rate. Catalysts are often incorporated into gas diffusion electrode structures to increase the rates of the desired electrode reactions.

Gas diffusion electrodes are employed in many different electrochemical devices, including metal-air batteries, electrochemical gas sensors, electrosynthesis of useful chemical compounds, and in particular, fuel cells.

A fuel cell is an energy conversion device that efficiently converts the stored chemical energy of its fuel into electrical energy by combining either hydrogen, stored as a gas, or methanol stored as a liquid or gas, with oxygen to generate electrical power. The hydrogen or methanol are oxidised at the anode and oxygen is reduced at the cathode. Both electrodes are of the gas diffusion type. The electrolyte has to be in contact with both electrodes and may be acidic or alkaline, liquid or solid, in nature. In proton exchange membrane fuel cells (PEMFC), the electrolyte is a solid proton-conducting polymer membrane, commonly based on perfluorosulphonic acid materials, and the combined structure formed from the membrane and the two gas diffusion electrodes is known as the membrane electrode assembly (MEA). The anode gas diffusion electrode is designed to be porous and allow the reactant hydrogen or methanol to enter the electrode from the face of the electrode exposed to the reactant fuel supply, and diffuse through the thickness of the electrode to the reaction sites which contain catalysts, usually platinum metal based, to maximise the electrochemical oxidation of hydrogen or methanol. The anode is also designed to allow electrolyte to penetrate through the face of the electrode exposed to the electrolyte and to also contact the same reaction sites. With acidic electrolyte types the product of the anode reaction are protons and these can then be efficiently transported from the anode reaction sites through the electrolyte to the cathode gas diffusion electrode. The cathode is also designed to be porous and allow oxygen or air to enter the electrode and diffuse through to the reaction sites. Catalysts are again commonly incorporated to maximise the rate of the reaction at the cathode reaction sites which combines the protons with oxygen to produce water. Product water then has to diffuse out of the electrode structure. The structure of the cathode has to be designed such that it enables the efficient removal of the product water. If water builds up in the electrode, it becomes more difficult for the reactant oxygen to diffuse to the reaction sites, and thus the performance of the fuel cell decreases.

Conventionally, the gas diffusion electrodes of the PEMFC, and indeed other devices, comprise many components and are typically made up of one, two or even more layers of these components. Typically the gas diffusion electrode will comprise one or more catalyst containing layers, which are supported onto a more rigid porous substrate layer. The catalyst containing layers enhance the desired electrode reactions and comprise a catalyst, which may be formed from a high surface area catalytic metal, often one of the precious metals, particularly platinum, either unsupported, as a metal black (for example U.S. Pat. No. 4,927,514, EP 0357077), or in a very high surface area form in which it is dispersed and supported on a high surface area electrically conducting gas porous carbon black or graphite (for example U.S. Pat. No. 4,447,505). The catalyst component may also be a non precious metal, such as one of the transition metals. In fuel cells which employ alkaline electrolytes, the cathode gas diffusion electrode can comprise catalysts based on macrocyclic compounds of cobalt (U.S. Pat. No. 4,179,359, EP 0 512 713). The catalyst layers may also comprise the high surface area carbon black itself, with no additional metal catalysts, in for example EP 0 026 995 where the catalyst layer for an air depolarised cathode in a chlor-alkali cell comprises carbon black materials.

The catalyst layers also comprise other non-catalytic components in addition to the catalyst material, usually polymeric materials which acts as binders to hold the electrode layer together and may also perform an additional function in controlling the hydrophobic/hydrophilic nature of the final structure. In the PEMFC in particular, the catalyst layers can also comprise other polymeric materials, such as proton conducting polymers, including forms of the proton conducting electrolyte itself, which are often mixed with the catalyst components or coated onto the catalyst containing layers, from solutions of the proton conducting polymer.

These catalyst layers are usually formed into suitable mixtures of the components and deposited onto a suitable porous substrate, for example conducting carbon materials such as semi graphitised papers, cloths or foams, or particularly in the case of alkaline electrolyte systems, metal meshes such as nickel or stainless steel, or in the case of sensors, various forms of porous PTFE sheet. In the acid electrolyte PEMFC the substrate is usually based on carbon paper or woven cloth materials (EP 0 026 995). These materials generally have a high bulk fibre density of greater than 0.4 g/cm$^3$. The primary role of the substrate is to act as a physical support for the catalyst containing layers and to provide an electrically conducting structure in direct contact with the catalyst layer. Additionally it also enables a mechanically stable gas diffusion electrode to be produced.

A major problem with conventional gas diffusion electrodes based on the carbon fibre paper substrates is the lack of flexibility due to the rigid substrate that is typically used. The conventional electrodes are consequently easily damaged on handling which leads to high reject rates during the electrode and MEA fabrication process. This obviously has an impact on cost. With conventional gas diffusion electrodes based on woven cloth substrates a problem concerns the lack of good dimensional stability, as the cloth can easily be stretched in the directions of the major planar faces (x and y directions). This can make the manufacturing of electrodes and MEAs using these substrates very difficult and therefore costly.

Furthermore the complexity of the conventional gas diffusion electrode requires a number of separate components such as the substrate and the catalyst layers to be brought together which results in a lengthy manufacturing process requiring a number of steps. Again, this increases the cost per unit of these gas diffusion electrodes to higher than is currently acceptable to make applications in power generation devices, such as fuel cells, commercially viable.

SUMMARY OF THE INVENTION

It is therefore an object of the present invention to provide a gas diffusion electrode with both increased dimensional stability and flexibility and which can therefore be produced at lower cost. A further object of the present invention is to provide an improved manufacturing process that is capable of producing large numbers of electrodes and MEAs at low unit cost, in high volumes and with high yields.

Accordingly, the present invention provides a gas diffusion electrode comprising a non-woven network of fibres, one or more catalyst components and at least one polymeric substance characterised in that the catalyst component is embedded within the fibre network. Generally, the non-woven network of fibres has a density of less than 0.3 g/cm$^3$, suitably less than 0.2 g/cm$^3$ and preferably less than 0.1 g/cm$^3$.

DETAILED DESCRIPTION OF THE PREFERRED EMBODIMENTS

Figure 1:
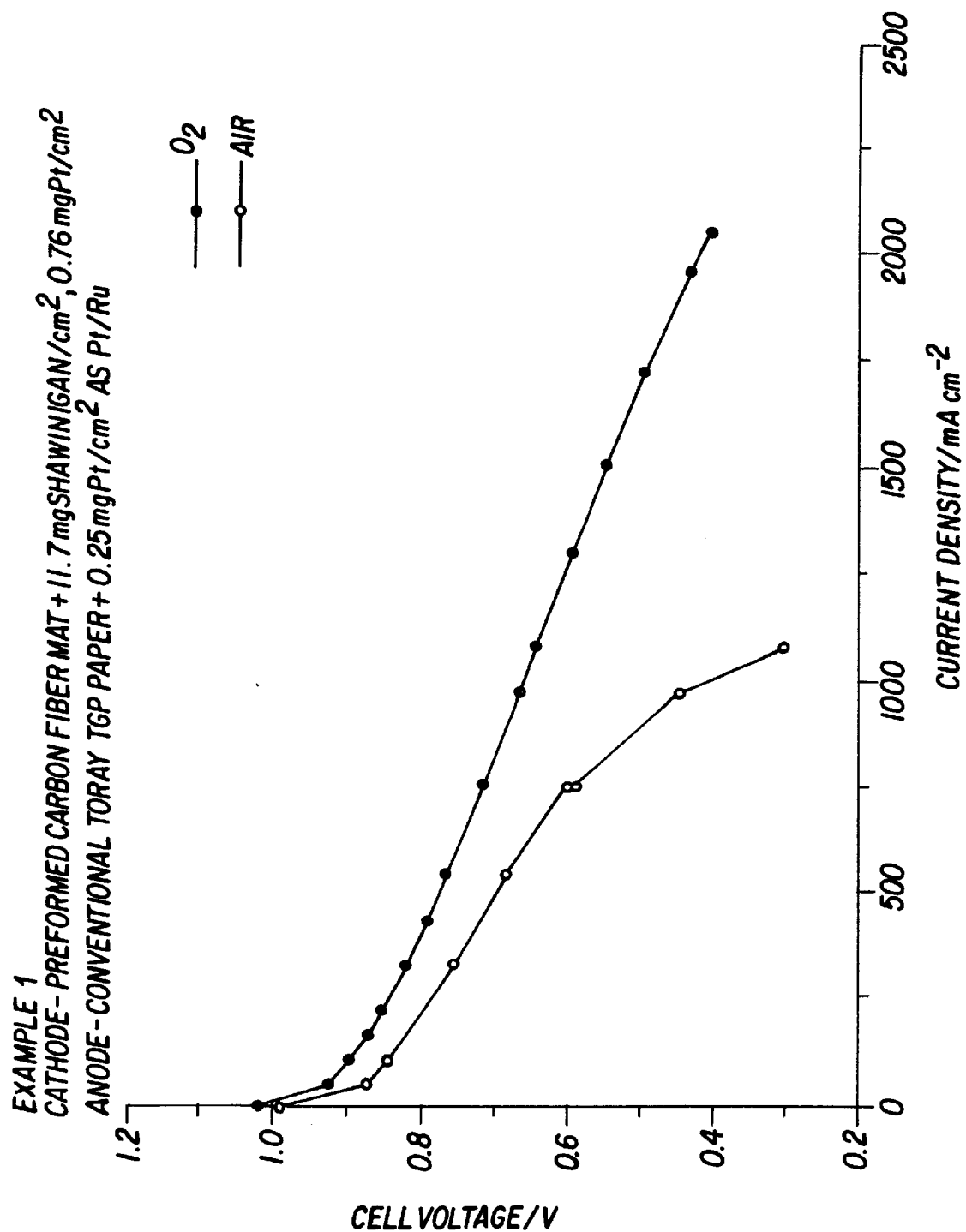
FIG. 1 shows a plot of cell voltage versus current density relating to Example 1.

As stated above, the present invention present invention provides a gas diffusion electrode comprising a non-woven network of fibres, one or more catalyst components and at least one polymeric substance characterised in that the catalyst component is embedded within the fibre network. Generally, the non-woven network of fibres has a density of less than 0.3 g/cm$^3$, suitably less than 0.2 g/cm$^3$ and preferably less than 0.1 g/cm$^3$.

The fibres, within the matrix, are normally randomly orientated in the x and y direction (in-plane) producing a two dimensional isotropic structure. Additionally, random orientation in the z direction (through-plane) occurs with the inclusion of very short fibres, typically lengths of ≦2 mm or very fine fibres, typically of diameters ≦1 μm. It is also possible to introduce anisotropic character into the fibre matrix by using longer fibres, typically ≧50 mm, in the composition, in combination with any method of laying down the layer that imparts a directional force into the mixture; such as extrusion or a paper making type processes. Fibres which are suitable for use in the present invention include carbon, glass, polymer, metal or ceramic fibres, preferably carbon, glass, metal or ceramic, typically of diameters in the range of 0.2 μm to 50 μm and with lengths from 0.05 mm to 300 mm, suitably 0.5 mm to 150 mm. If fibres other than carbon fibres or other electrically conducting fibres are used it is necessary that the catalyst component comprises carbon and optionally one or more other catalyst components such as a metal or a metal supported on carbon in order that the final electrode structure is electrically conducting.

By the term catalyst is meant a material that promotes or enhances the rate of the reaction of interest but remains unaltered by the reaction. The catalyst component or components selected will depend on the application for which the gas diffusion electrode is being used. These may be, for example, a precious metal or a transition metal as the metal or metal oxide, either unsupported or supported in a dispersed form on a carbon support; a carbon or an organic complex, in the form of a high surface area finely divided powder or fibre, or a combination of these options.

The polymeric substances act as a binder to hold the electrode layer together. Depending on the polymeric substance used it may also act to provide essential electrode structural properties, such as control of the hydrophobic/hydrophilic balance. Examples of such polymers include polytetrafluoroethylene (PTFE), fluorinated ethylene-propylene (FEP), polyethylene, polypropylene, ethylene-propylene. The polymeric material can also act to provide the ionic conduction pathway in the electrode. Such proton conducting polymers are for example the perfluorosulphonic acid materials, produced by E. I. DuPont de Nemours, referred to as NAFION®.

A first embodiment of the present invention provides a gas diffusion electrode as hereinbefore described wherein the catalyst component is one or more metals or their oxides in the form of finely divided unsupported powders or as metals in a dispersed form on a carbon support. Suitably the one or more metals may be a precious metal (Pt, Pd, Ru, Rh, Ir, Os, Au and Ag) or a transition metal selected from groups IVB, VB, VIB, VIIB, VIII, IB or IIB of the Periodic Table in "Handbook of Chemistry and Physics", 64th Edition, CRC Press, or a combination or alloy thereof. Preferably, the one or more metals is a precious metal, particularly Pt, or an alloy thereof.

A second embodiment of the invention provides a gas diffusion electrode as hereinbefore described wherein the catalyst component is one or more carbon blacks.

A major advantage of the present invention is that a free-standing, dimensionally stable and highly flexible gas diffusion electrode is obtained. The incidence of damage to the electrode on handling during manufacture is therefore minimised thus reducing the number of faulty or rejected electrodes, and consequently the cost is reduced. Furthermore, the intrinsic material cost is significantly reduced over carbon paper or woven cloths. In addition, the electrode of the invention is more amenable to high volume continuous production processes due to its high dimensional stability.

A further advantage of the gas diffusion electrodes of the present invention is improved performance due to reduced mass transport losses. During operation of the PEM fuel cell, product water is produced at the cathode. This has to be efficiently removed from the electrode structure so that it does not build up in the structure and impede further oxygen diffusion (mass transport) to the reaction sites. With conventional electrodes this is not possible to fully achieve, and it becomes difficult to operate the cell efficiently at higher current densities, which is a desirable goal to improve power density. The presence of fibres in the catalyst layers can help to improve the efficiency of removal of the product water from the catalyst sites where it is produced into the reactant gas stream where it is transported out of the cell by the reactant gas flow. Accordingly, a further embodiment of the present invention provides a gas diffusion electrode suitable for use in electrochemical cells, said electrode comprising a current collector and a catalyst structure and characterised in that a continuous network of fibres for two-way transport is distributed in the catalyst containing layer.

Gas diffusion electrodes of the present invention are suitable for low cost manufacture. The electrodes may be manufactured by one of two general methods.

The electrodes may be manufactured by taking a preformed non-woven fibre material and applying the catalyst layers comprising the catalyst and polymeric materials. This can be done by any number of coating processes such as printing, rolling, K-bar or doctor blade methods.

A second method for the manufacture of the gas diffusion electrode of the present invention and which provides a further aspect of the present invention, comprises mixing the fibres with at least one catalyst component or a polymeric substance and thereafter forming the gas diffusion electrode by adapting a continuous manufacturing process, for example paper-making, calendering or extrusion. For example, in a process based on paper-making technology, the fibres are dispersed in water with at least one catalyst component and a polymeric substance to form a dilute slurry and thereafter forming a continuous structure by the controlled deposition of said slurry onto a moving mesh bed, dewatering of the solids and drying/compaction of the fibre containing layer under a suitable time/pressure/temperature regime.

A major advantage of this method is that the gas diffusion electrode is easily manufactured in a fewer number of steps using continuous manufacturing techniques such as conventional paper making techniques thus making it more cost effective and commercially viable. Using conventional paper making techniques, the fibres are dispersed as a dilute slurry in water with the catalyst component and the polymeric substance which can then be deposited and formed into a non-woven mat with the catalyst component embedded within the mat. The mat may be produced in continuous lengths with the prospect of producing the gas diffusion electrode in very large volumes with the minimum processing and in a very cost effective manner.

A further advantage is that it is possible to combine two or more layers (at least one of the layers being an electrode of the invention) to form a multi-layer gas diffusion electrode structure at the same rate as a single-layer could be produced.

An additional advantage to be gained from this type of matrix structure, and the methods of fabrication, is that the incorporation of polymeric materials into the structure can be carefully controlled, unlike coatings applied to conventional materials such as carbon fibre paper and cloth where the applied polymer will coat all available surfaces. Both the fibres and the catalyst component or components may be precoated with the appropriate polymer or polymers, at the required loading, allowing the structure to contain any number of types of polymer, each located within specific areas of the structure. This gives the ability to tailor the hydrophobic/hydrophilic nature of the matrix to give improved performance characteristics. The incorporation of proton exchange polymers into the structure is also easily facilitated, as is the incorporation of thermoplastic polymer materials for hot forming the electrodes into specific shapes.

The present invention also relates to a membrane electrode assembly and a method for the manufacture thereof wherein one or both of the electrodes are the gas diffusion electrode of the present invention. A still further aspect of the present invention relates to a fuel cell and a method for the manufacture thereof comprising at least one gas diffusion electrode of the present invention.

The present invention is not limited to the use of the gas diffusion electrode in a fuel cell and any electrochemical device which comprises a gas diffusion electrode of the invention is within its scope.

The structure of the present invention is not necessarily limited to gas diffusion electrodes but may also be useful in structures where a robust catalyst containing gas porous structure is required for such purposes as gas recombination in sealed batteries (to prevent pressure build up from the electrolysis of the electrolyte) and oxygen scavenging of enclosed systems that require the removal of oxygen to very low levels using the reaction with hydrogen.

The present invention will now be described by way of example only which is not intended to be limiting thereof.

The materials of the invention can be employed as either the anode or cathode, and indeed both anode and cathode in the electrochemical cells of the specific application. In the following examples, the electrodes are incorporated as the cathode in membrane electrode assemblies (MEAs) and evaluated in a proton exchange membrane fuel cell, with hydrogen as the anode fuel and air or pure oxygen as the cathode oxidant. It is at the cathode that the majority of cell performance (voltage) losses occur in cells operating with hydrogen as the fuel. The MEAs were fabricated by hot pressing the anode and cathode against each face of the solid proton conducting electrolyte membrane, as is commonly practised in the art.

The anodes were of the more conventional type, currently widely employed in the PEMFC. They comprised a conventional pre-teflonated rigid conducting carbon fibre paper substrate (Toray TGP-H-090, available from Toray Industries Inc, Tokyo, Japan) to which was applied a layer of a 20 wt % platinum, 10 wt % ruthenium catalyst, supported on Cabot VULCAN carbon black XC72R (from Johnson Matthey Inc, New Jersey, U.S.A.), at an electrode platinum loading of 0.25 mg/cm$^2$ of electrode geometric area. The MEAs were evaluated in a PEMFC single cell, with a geometric electrochemically active area of 50 cm$^2$. The single cell consisted of graphite plates into which flowfields were machined to distribute reactant gases and humidification water, and remove products. The MEA was located between the flowfield plates. The operation of the single cell was controlled from a purpose built test station facility (from GlobeTech, of Bryans, Tex. U.S.A.). The "performance" of the fuel cell was assessed by measuring the voltage and current density relationship using a standard operating procedure. Unless otherwise stated, these conditions were typically, a reactant gas inlet temperature of 80°0 C., a pressure of both anode and cathode reactant gases of 3 atmospheres, and a reactant stoichiometry of 1.5 for hydrogen and 2.0 for air.

EXAMPLE 1

A first particulate catalyst component was provided by dispersing 50 weight parts of a carbon black (SHAWINIGAN black, from Chevron Chemicals, Houston, Tex., U.S.A.) in 1200 parts of demineralised water. To this was added 6 weight parts of polytetrafluoroethylene (PTFE) as a dispersion in water (ICI FLUON GP1, 64 wt % solids suspension) and the mixture stirred to entrain the PTFE particles within the carbon catalyst material. The slurry was redispersed using a high shear mixer to produce a smooth mixture.

A second particulate catalyst material was provided by dispersing 100 weight parts of a 40 wt % platinum catalyst, supported on carbon black (Johnson Matthey FC-40) in 30 parts of a 9.5% dispersion of NAFION EW1100 (E. I. DuPont De Nemours & Co.) in water, prepared according to methods described in EPA 731,520. The particulate catalyst was dispersed using a high shear mixer to produce a smooth mixture.

A pre-formed non-woven carbon fibre structure was a 17 g/m$^2$ (≡0.07 g/cm$^3$) density carbon fibre mat, supplied as OPTIMAT 203 (from Technical Fibre Products, Kendal, Cumbria, UK). This was precoated with PTFE by soaking for 5 minutes in a solution of 120 parts by weight of GP1

PTFE emulsion in 2100 parts by weight of water then draining and allowing to dry. The coated carbon fibre mat was heated to 350° C. in air to sinter the PTFE.

The electrode of the invention was formed by pressing the first particulate catalyst material into the non-woven carbon fibre structure using a vacuum bed to remove the water and pull the particulate catalyst material into the structure. A total fill of 11.7 g SHAWINIGAN carbon per cm$^2$ carbon fibre paper geometric area was achieved. The resulting sheet was pressed at 260° C. and 150 lb per sq inch for 2 minutes to compact the structure. A layer of the second particulate catalyst material was then applied to one face of the filled non-woven structure to provide a platinum loading of 0.76 mg/cm$^2$ geometric area within the remaining carbon fibre structure and pressed at 200 lb per square inch to compact the layer.

The electrode formed the cathode of an MEA, with the face of the electrode comprising the platinum catalyst component bonded to the membrane electrolyte face. The membrane employed was Du Pont NAFION 112. The single cell results are shown in FIG. 1 and demonstrate that good cell performances were obtained from the MEA comprising the lower cost, more manufacturable electrode of the invention. For operation on pure oxygen very high current densities of over 2.0 A/cm$^2$ were obtained. For most practical applications of the PEMFC, the oxidant will be air, and these applications will require that at least a current density of 500 mA/cm$^2$ is achieved. As illustrated in the Figure, current densities up to 1.0 A/cm$^2$ were obtained, and the results represent performances typical of a satisfactorily performing MEA. It is worth noting that on air operation there was a tendency for the cell voltage to decrease more rapidly as the current density increased toward 1.0 A/cm$^2$, compared to the pure oxygen data. This is an example of cell voltage decrease due to mass transport losses, relating to the ease with which reactant oxygen in air can diffuse to the electrode reaction sites. This is also a typical characteristic of cell current vs voltage plots seen with conventional MEAs, fabricated with electrodes comprising conducting substrates such as high density carbon fibre paper.

EXAMPLE 2

A first particulate catalyst material was prepared by dispersing 80 weight parts of SHAWINIGAN carbon black in 1200 parts of water. To this was added 20 weight parts of polytetrafluoroethylene solids (PTFE) as a dispersion in water (ICI FLUON GP1, 64 wt % solids suspension) and the mixture stirred to entrain the PTFE particles within the carbon catalyst material The slurry was redispersed using a high shear mixer to produce a smooth mixture.

Chopped carbon fibres (Type RK 10, from RK Carbon Fibres Ltd, UK) at a fibre length of 37 mm were treated with GP1 polytetrafluoroethylene dispersion in water to give a 7 wt % coating on the fibres. Further RK10 fibres of length 12 mm and 1 mm were similarly treated.

The particulate catalyst mixture, comprising 1.25 g of solid material (carbon and PTFE components), was dispersed, with mixing, in demnineralised water (500 cm$^3$) with 0.0105 g of the 37 mm teflonated fibres, 0.089 g of the 12 mm teflonated fibres and 0.43 g of the 1 mm teflonated fibres, 0.0485 g of glass microfibre (Evanite 608 from Evanite Fibre Corporation, Corvallis, Oreg., U.S.A.) and 0.036 g of polyvinylalcohol powder (BDH Chemicals, Poole, Dorset, UK). An electrode of the invention was fabricated from the resulting mixture, in a single step process, based on the principles of paper-making technology, as a sheet of size 214 cm$^2$ in a standard SCA sheet former (AB Lorentzen & Wettre, Box 4, S-163 93 Stockholm, Sweden). The sheet was air dried at 100° C., and then fired in air at a temperature in excess of 350° C.

A second layer of a second particulate catalyst material, was formed by applying an ink, comprising 40 wt % platinum catalyst, supported on carbon black (Johnson Matthey FC-40) in a 9.5% dispersion of NAFION EW 1100 (E. I. DuPont De Nemours & Co.) in water, prepared according to methods described in EPA 731,520, to an (OPTIMAT 203 carbon fibre mat of density 10 g/m$^2$, and air dried at 100° C. The platinum loading was 0.78 mg/cm$^2$ geometric area of carbon fibre mat.

Figure 2:
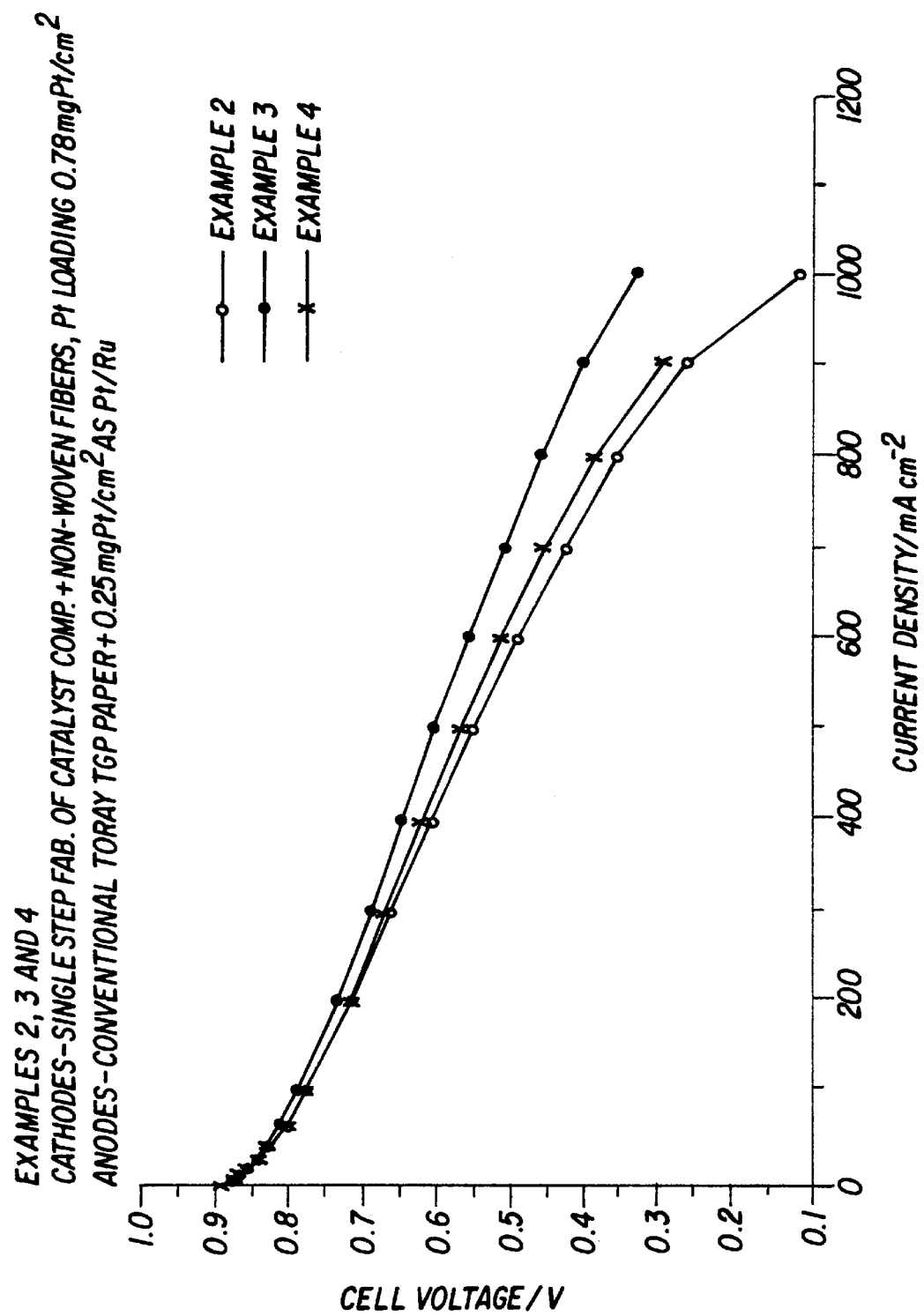
FIG. 2 shows a plot of cell voltage versus current density relating to Example 2, 3 and 4.

The second catalyst containing electrode layer was applied to one face of the first electrode layer and the layers were pressed at 200 lb per square inch to compact the layers. The combined two electrode layers formed the cathode of an MEA, with the platinum catalyst containing face of the cathode being bonded to the membrane electrolyte face. The membrane electrolyte was NAFION 115. The single cell results are shown in FIG. 2.

EXAMPLE 3

The preparation of the cathode as described in Example 2 was followed, with the exception that the glass microfibre content (EVANITE 608), in the first particulate catalyst mixture was increased to 0.097 g. The MEA was fabricated as described in Example 2. The single cell results are shown in FIG. 2.

EXAMPLE 4

The first particulate catalyst material was prepared as described for the first particulate material in Example 2. A second particulate catalyst material was prepared by dispersing 85 weight parts of carbon black (VULCAN XC72R, from Cabot Corp, Billerica, Mass., U.S.A.) in 1200 parts of water. To this was added 15 weight parts of polytetrafluoroethylene solids (from GP1 solution) and the mixture stirred to entrain the PTFE particles within the carbon catalyst material. The slurry was redispersed using a high shear mixer to produce a smooth mixture.

A mixture of 7.8 g of the first particulate catalyst mixture (equivalent to 0.603 g of solids) was dispersed with a mixture of 7.8 g of the second particulate catalyst mixture (equivalent to 0.603 g of solids) in water (500 cm$^3$) with 0.0105 g of the 37 mm teflonated fibres 0.089 g of the 12 mm teflonated fibres and 0.43 g of the 1 mm teflonated fibres, 0.097 g of glass microfibre (Evanite 608) and 0.036 g of polyvinylalcohol powder (BDH) using a blender mixer. An electrode of the invention was fabricated from the resulting mixture, in a single step process, based on the principles of paper-making technology, as a sheet of size 214 cm$^2$ in a standard SCA sheet former (AB Lorentzen & Wettre, Box 4, S-163 93 Stockholm, Sweden). The sheet was air dried at 100° C., and then fired in air at a temperature in excess of 350° C.

A further cathode electrode layer comprising a platinum catalyst material was prepared as described in Example 2. The complete cathode and MEA were fabricated as described in Example 2. The single cell results for operation on air are shown in FIG. 2. Examples 2, 3 and 4, in which the electrodes of the invention were produced by an even lower cost and more manufacturable single process step, by incorporating the catalyst components with the non-woven fibre materials, again produced MEAs with very acceptable current vs voltage performance characteristics. Comparison of Examples 2 and 3 illustrate that the high current density performance was markedly influenced by the composition of the fibre mix employed to fabricate the electrode, with the Example 3 demonstrating improved high current density performance due to improved mass transport properties. This feature of the electrode is particularly important for applications of the PEMFC in powering vehicles, where cell operation at ever increasing current densities is a requirement to reduce the size, weight and cost of the fuel cell stack.

We claim:

1. A gas diffusion electrode comprising a flexible, free-standing catalyst layer containing a continuous, non-woven network of fibres and a polymeric substance; and, optionally, a second or more layer(s) applied to the flexible, free-standing catalyst layer.

2. A gas diffusion electrode as claimed in claim 1, comprising a free-standing catalyst layer consisting of a continuous, non-woven network of carbon fibres and, optionally, glass, polymer, metal and ceramic fibres, wherein the fibres have a diameter of $\leq 1$ $\mu$m and a length of from 0.2 $\mu$m to 50 $\mu$m, which fibres are pre-coated with one or more polymers including polytetrafluoroethylene, and wherein the density of the network is less than 0.3 g/cm$^3$, and one or more catalyst material(s).

3. A gas diffusion electrode comprising a flexible, free-standing layer that comprises a mixture of (a) non-woven fibres;

(b) one or more catalyst material(s); and (c) one or more polymeric substance(s);

and, optionally, a second or more layer(s) applied to the flexible, free-standing layer.

4. A gas diffusion electrode as claimed in claim 1 or claim 3, wherein the density of the non-woven network of fibres is less than 0.3 g/cm$^3$.

5. A gas diffusion electrode as claimed in claim 1 or claim 3, wherein the non-woven fibres have a diameter of $\leq 1$ $\mu$m.

6. A gas diffusion electrode as claimed in claim 1 or claim 3, wherein the non-woven fibres are from 0.05 mm to 300 mm long.

7. A gas diffusion electrode as claimed in claim 1 or claim 3, wherein the non-woven fibres are from 0.2 $\mu$m to 50 $\mu$m long.

8. A gas diffusion electrode as claimed in claim 1 or claim 3, wherein the non-woven network of fibres is less than 0.1 g/cm$^3$.

9. A gas diffusion electrode as claimed in claim 1 or claim 3, wherein the non-woven fibres are bound with polyvinyl alcohol to form a flexible matrix.

10. A gas diffusion electrode as claimed in claim 1 or claim 3, wherein the non-woven fibres are pre-coated with one or more polymer(s).

11. A gas diffusion electrode as claimed in claim 1 or claim 3, wherein the non-woven fibres are pre-coated with one or more polymers selected from the group consisting of those that control the hydrophobic/hydrophilic balance of the electrode; those that provide the ionic conduction pathway in the electrode; and thermoplastic polymers.

12. A gas diffusion electrode as claimed in claim 1 or claim 3, wherein the non-woven fibres are pre-coated with one or more polymers selected from the group consisting of polytetrafluoroethylene, fluorinated ethylene-propylene, polyethylene, polypropylene, ethylene-propylene; and perfluorosulphonic acid polymers.

13. A gas diffusion electrode as claimed in claim 1 or claim 3, wherein the non-woven fibres are selected from the group consisting of carbon, glass, polymer, metal and ceramic fibres.

14. A gas diffusion electrode as claimed in claim 1 or claim 3, wherein the non-woven fibres are selected from the group consisting of carbon and glass microfibre.

15. A gas diffusion electrode as claimed in any one of claim 1, claim 2 or claim 3, wherein the catalyst material(s) is or includes carbon black.

16. A gas diffusion electrode as claimed in any one of claim 1, claim 2 or claim 3, comprising a second catalyst layer applied to the flexible, free-standing catalyst layer.

17. A gas diffusion electrode as claimed in any one of claim 1, claim 2 or claim 3, comprising a second catalyst layer applied to the flexible, free-standing catalyst layer, which second layer comprises one or more metals or their oxides in the form of an unsupported finely divided powder or one or more metals in dispersed form on a carbon support.

18. A gas diffusion electrode as claimed in any one of claim 1, claim 2 or claim 3, comprising a second or more layer(s) applied to the flexible, free-standing layer, wherein at least the second layer comprises a particulate precious metal supported on carbon black in a polymer dispersion.

19. A membrane electrode assembly wherein one or both of the gas diffusion electrodes is an electrodes according to any one of claim 1, claim 2 or claim 3.

20. A fuel cell which comprises a gas diffusion electrode according to any one of claim 1, claim 2 or claim 3.

* * * * *

UNITED STATES PATENT AND TRADEMARK OFFICE
CERTIFICATE OF CORRECTION

PATENT NO. : 5,865,968
DATED : February 2, 1999
INVENTOR(S) : Jan Denton, et. al.

It is certified that error appears in the above-identified patent and that said Letters Patent is hereby corrected as shown below:

```
Column 9, line 44, delete "is" and insert --has a density--.
Column 10, lines 24 and 25, change "any one of claim 1, claim 2 or claim 3"
to --claim 1 or claim 2--.
Column 10, lines 27 and 28, change "any one of claim 1, claim 2 or claim 3"
to --claim 1 or claim 2--.
Column 10, lines 31 and 32, change "any one of claim, claim 2 or claim 3"
to --claim 1 or claim 2--.
Column 10, lines 37 and 38, change "any one of claim 1, claim 2 or claim 3"
to --claim 1 or claim 2--.
Column 10, line 44, change "any one of claim 1, claim 2 or claim 3" to --
claim 1 or claim 2--.
Column 10, line 46, change "any one of claim, claim 2 or claim 3" to --
claim 1 or claim 2--.
```

Signed and Sealed this

Sixth Day of April, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,865,968
DATED : February 2, 1999
INVENTOR(S) : Jan DENTON et al

It is certified that error appears in the above-identified patent and that said Letters Patent are is hereby corrected as shown below:

Column 9, line 44, change "is" to --has a density--.
Column 10, line 24, delete ", claim 2".
Column,10, line 27, delete ", claim 2".
Column 10, line 30, delete ", claim 2".
Column 10, line 36, delete ", claim 2".
Column 10, line 42, delete ", claim 2".
Column 10, line 44, delete ", claim 2".

Signed and Sealed this

Thirteenth Day of February, 2001

Attest:

NICHOLAS P. GODICI

Attesting Officer    Acting Director of the United States Patent and Trademark Office